United States Patent Office 3,125,573
Patented Mar. 17, 1964

3,125,573
1 - TERTIARY - AMINO - 1 - (MONOCARBOXYLIC ARYL)-ω-TERTIARY - AMINO-2-AZA-1-ALKENES AND THEIR PREPARATION
Bill Elpern, Walnut Creek, Calif., assignor to Sterling Drug Inc., New York, N.Y., a corporation of Delaware
No Drawing. Filed May 17, 1960, Ser. No. 29,584
22 Claims. (Cl. 260—247.5)

This invention relates to benzamidine derivatives and in particular is concerned with 1-tertiary-amino-1-(monocarbocyclic aryl)-ω-tertiary-amino-2-aza-1-alkenes and salts thereof. The invention is also concerned with processes for the preparation of said alkenes and intermediates therein.

In the 1-tertiary-amino-1-(monocarbocyclic aryl)-ω-tertiary-amino-2-aza-1-alkenes of the invention, the alkene chain has at least four members and at most seven members. Thus, the 2-aza-1-alkenes are 2-aza-1-butenes

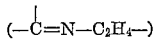

2-aza-1-pentenes

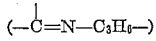

2-aza-1-hexenes

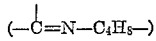

or 2-aza-1-heptenes

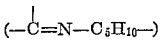

and such 2-aza-1-alkenes substituted in the 3-, 4-, 5- or 6-position by lower-alkyl. The aza-alkene nomenclature is used in preference to the benzamidine nomenclature, because the naming of substituents is rendered simpler and easier to visualize.

The compounds of the invention can be represented by the following structural formula

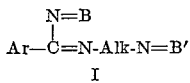

wherein Ar represents monocarbocyclic aryl, Alk represents lower-alkylene, and N=B and N=B' represent tertiary-amino. The invention also includes the acid-addition and quaternary ammonium salts of the foregoing compounds.

In the above general Formula I, the monocarbocyclic aryl radical, Ar, stands for phenyl or phenyl substituted by conventional groups inert under the conditions of the processes used to prepare the compounds. A preferred class of Ar comprises phenyl and phenyl substituted by from one to three radicals selected from lower-alkyl, lower-alkoxy, halogen (including fluorine, chlorine, bromine and iodine), lower-alkylmercapto, trifluoromethyl and nitro. The lower-alkyl, lower-alkoxy and lower-alkylmercapto radicals contain from one to about four carbon atoms, thus including, inter alia, methyl, ethyl, propyl, isopropyl, butyl, methoxy, ethoxy, propoxy, isopropoxy, butoxy, methylmercapto, ethylmercapto and butylmercapto.

In the above general Formula I, Alk stands for a lower-alkylene bridge, having at least two and not more than about five carbon atoms, in which the points of attachment to the remainder of the molecule are on different carbon atoms. The lower-alkylene bridge can be straight or branched and includes such groupings as —CH₂CH₂—, —CH₂CH(CH₃)—, —CH(CH₃)CH₂—,
—CH₂CH₂CH₂—, —CH₂CH(CH₃)CH₂—
—CH₂CH₂CH₂CH₂—, —CH(C₂H₅)CH₂—
—CH₂CH₂CH₂CH₂CH₂—, and

—CH₂CH₂CH(CH₃)CH₂—

A preferred lower-alkylene bridge is ethylene, in view of the ready availability of starting materials.

In the above general Formula I, —N=B and —N=B' stand for the same or different tertiary-amino radicals. They are preferably basic in character and have a molecular weight less than about 200. Basic tertiary-amino radicals are those of the aliphatic or araliphatic type that impart to the molecules which contain them sufficient basicity so that the compounds readily form acid-addition salts with strong inorganic and organic acids. A particularly preferred group of tertiary-amino radicals are di-lower-alkylamino; dicycloalkylamino in which cycloalkyl has from 5 to 6 ring members; (lower-alkyl)-(cycloalkyl)amino in which cycloalkyl has from 5 to 6 ring members; polymethylenimino having from 5 to 7 ring members, for example, 1-pyrrolidyl, 1-piperidyl, hexamethylenimino, and lower-alkylated derivatives thereof; 4-morpholinyl; di-(phenyl-lower-alkyl)amino; and lower-alkyl-(phenyl-lower-alkyl)amino. In the foregoing radicals, the term lower-alkyl stands for alkyl groups containing from one to about six carbon atoms.

The compounds of the invention are prepared by the following reaction scheme:

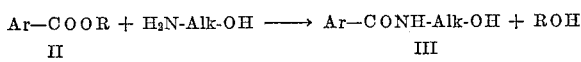

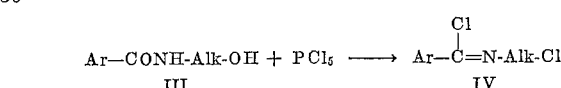

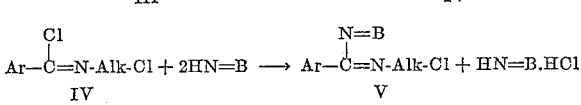

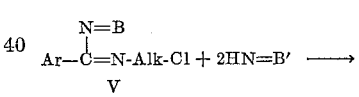

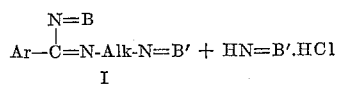

When a lower-alkyl monocarbocyclic aryl carboxylate (II, R is lower-alkyl) is caused to react with an ω-hydroxy-lower-alkylamine, there is obtained an N-(ω-hydroxy-lower-alkyl)-monocarbocyclic aryl carboxylic acid amide (III). The compounds of Formula III are a known class of compounds.

When the amide III is then caused to react with phosphorus pentachloride which replaces the oxygen functions by chlorine there is obtained a 1,ω-dichloro-1-(monocarbocyclic aryl)-2-aza-1-alkene (IV). The reaction is carried out preferably with an excess of phosphorus pentachloride in an inert solvent at a temperature between about 50° C. and 150° C.

The next step comprises reacting the dichloro compound IV with about two molar equivalents of a secondary amine, HN=B. One equivalent of amine condenses with the more active chlorine atom attached to the carbon atom adjacent to the aryl radical, and the second equivalent takes up the hydrogen chloride produced in the reaction. The reaction takes place in an inert solvent at a temperature between about 50° C. and 100° C. The product produced is a 1-tertiary-amino-1-(monocarbocyclic aryl)-ω-chloro-2-aza-1-alkene (V).

The final step comprises reacting the chloro amine V with at least two molar equivalents of a secondary amine, HN=B'. One equivalent of amine condenses with the terminal chlorine atom and a second equivalent takes up the hydrogen chloride produced in the reaction. The reaction takes place in an inert solvent at a temperature between about 100° C. and 150° C.

In the event that compounds of Formula I are desired where N=B and N=B' are identical tertiary-amino radicals, the last two steps of the synthesis can be carried out simultaneously by causing the dichloride IV to react with at least four molar equivalents of secondary amine under the conditions used for the final step, i.e., at a temperature between about 100° C. and 150° C.

The compounds of Formula I possess two basic centers, one at the terminal tertiary-amino radical, N=B', and the other in the benzamidine moiety. They thus form mono- or di-acid-addition salts upon addition of strong acids and mono- or di-quaternary ammonium salts upon addition of esters of strong acids. These salts are the full equivalent of the corresponding free bases insofar as their physiological properties are concerned. Both the free base and salt forms are considered to be one and the same invention.

The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the free base and serve as intermediates for non-toxic quaternary salts by conventional ion exchange reactions. All acid-addition salts, regardless of the nature of the anions, are useful as intermediates in the purification of the free bases.

Pharmacological evaluation of the compounds of the invention having the Formula I has shown that they possess diuretic and chloruretic activity when administered orally to dogs in non-toxic doses. The new compounds are thus useful for increasing urinary elimination of sodium and chloride ions and water in the treatment of conditions in which such effects are desirable, for example, edematous conditions. They are most conveniently administered in the form of tablets, powder or aqueous dispersions, and the formulations are compounded in conventional fashion using an appropriate amount of the active ingredient or a salt thereof with ordinary pharmaceutical excipients.

The structure of the compounds of the invention was established by the mode of synthesis and by the fact that elementary analyses were in agreement with the proposed structures.

The following examples will further illustrate the invention without the latter being limited thereby.

(A) N-(ω-HYDROXY-LOWER-ALKYL)-MONOCARBOCYCLIC ARYL CARBOXYLIC ACID AMIDES, ArCONH—Alk—OH (III)

*Example A1*

N-(2-hydroxyethyl)benzamide.—A mixture of 136 g. of methylbenzoate and 305.4 g. of ethanolamine was refluxed for three hours. The excess ethanolamine and the methanol formed in the reaction were removed in vacuo, and the residue was distilled at 178–183° C. (0.1 mm.) to give 152.0 g. of N-(2-hydroxyethyl)benzamide, M.P. 61° C. (uncorr.).

*Example A2*

N-(2-hydroxyethyl)-4-chlorobenzamide.—A mixture of 97.8 g. of methyl 4-chlorobenzoate and 171.1 g. of ethanolamine was refluxed for one and one-half hours. The volatile materials were removed in vacuo, and the residue was recrystallized from dilute alcohol, using activated charcoal for decolorizing purposes, to give 92.4 g. of N-(2-hydroxyethyl)-4-chlorobenzamide, M.P. 113–117° C. (uncorr.).

*Example A3*

N-(2-hydroxyethyl)-2-chlorobenzamide was prepared from 47.8 g. of methyl 2-chlorobenzoate and 85.5 g. of ethanolamine according to the manipulative procedure described above in Example A2. The crude crystalline product was recrystallized first from water and then from benzene to give N-(2-hydroxyethyl)-2-chlorobenzamide, M.P. 72.4–75.0° C. (corr.).

*Analysis.*—Calcd. for $C_9H_{10}ClNO_2$: C, 54.14; H, 5.05; N, 7.02. Found: C, 53.83; H, 5.21; N, 7.01.

*Example A4*

N-(2-hydroxyethyl)-3-chlorobenzamide was prepared from 100 g. of methyl 3-chlorobenzoate and 177 g. of ethanolamine according to the manipulative procedure above in Example A2. The crude crystalline product was crystallized from water and dried in a vacuum oven at 50–55° C. for four hours to give 86.6 g. of N-(2-hydroxyethyl)-3-chlorobenzamide, M.P. 97.4–98.4° C. (corr.).

*Analysis.*—Calcd. for $C_9H_{10}ClNO_2$: C, 54.14; H, 5.05; N, 7.02. Found: C, 54.04; H, 5.21; N, 7.04.

*Example A5*

N-(2-hydroxyethyl)-4-methoxybenzamide was prepared from 166.2 g. of methyl 4-methoxybenzoate and 305.4 g. of ethanolamine according to the manipulative procedure described above in Example A2. The crude product was recrystallized from water and dried in a vacuum desiccator for several days to give 97.7 g. of N-(2-hydroxyethyl)-4-methoxybenzamide, M.P. 101.5–104.2° C. (corr.).

*Analysis.*—Calcd. for $C_{10}H_{13}NO_3$: C, 61.52; H, 6.71; N, 7.18. Found: C, 61.88; H, 6.44; N, 7.17.

*Example A6*

N-(2-hydroxyethyl)-4-nitrobenzamide was prepared from 90.6 g. of methyl 4-nitrobenzoate and 152.1 g. of ethanolamine according to the manipulative procedure described in Example A2. The crude product was recrystallized three times from water and dried for several hours in a vacuum oven at 65–68° C. to give 83 g. of N-(2-hydroxyethyl)-4-nitrobenzamide, M.P. 131–132° C. (uncorr.).

*Analysis.*—Calcd. for $C_9H_{10}N_2O_4$: C, 51.42; H, 4.80. Found: C, 50.98; H, 5.22.

*Example A7*

N-(2-hydroxyethyl)-3-methylbenzamide can be prepared by replacing the methyl 4-chlorobenzoate in Example A2 by a molar equivalent amount of methyl 3-methylbenzoate.

*Example A8*

N-(2-hydroxyethyl)-3-bromobenzamide can be prepared by replacing the methyl 4-chlorobenzoate in Example A2 by a molar equivalent amount of methyl 3-bromobenzoate.

*Example A9*

N-(2-hydroxyethyl)-4-methylbenzamide can be prepared by replacing the methyl 4-chlorobenzoate in Example A2 by a molar equavalent amount of methyl 4-methylbenzoate.

*Example A10*

N-(hydroxyethyl)-4-(n-butoxy)benzamide can be prepared by replacing the methyl 4-chlorobenzoate in Example A2 by a molar equivalent amount of methyl 4-(n-butoxy)benzoate.

*Example A11*

N-(2-hydroxyethyl)-3,4-dimethoxy benzamide can be prepared by replacing the methyl 4-chlorobenzoate in Example A2 by a molar equivalent amount of methyl 3,4-dimethoxybenzoate.

*Example A12*

N-(2-hydroxyethyl)-3,4,5-trimethoxybenzamide can be prepared by replacing the methyl 4-chlorobenzoate in Example A2 by a molar equivalent amount of methyl 3,4,5-trimethoxybenzoate.

*Example A13*

N-(2-hydroxyethyl)-3-chloro-4-methoxybenzamide can beprepared by replacing the methyl 4-chlorobenzoate in Example A2 by a molar equivalent amount of methyl 3-chloro-4-methoxybenzoate.

*Example A14*

N-(2-hydroxyethyl)-4-fluorobenzamide can be prepared by replacing the methyl 4-chlorobenzoate in Example A2 by a molar equivalent amount of methyl 4-fluorobenzoate.

*Example A15*

N-(2-hydroxyethyl)-4-iodobenzamide can be prepared by replacing the methyl 4-chlorobenzoate in Example A2 by a molar equivalent amount of methyl 4-iodobenzoate.

*Example A16*

N-(2-hydroxyethyl)-4-methylmercaptobenzamide can be prepared by replacing the methyl 4-chlorobenzoate in Example A2 by a molar equivalent amount of methyl 4-methylmercaptobenzoate.

*Example A17*

N-(2-hydroxyethyl)-4-trifluoromethylbenzamide can be prepared by replacing the methyl 4-chlorobenzoate in Example A2 by a molar equivalent amount of methyl 4-trifluoromethylbenzoate.

*Example A18*

N-(3-hydroxypropyl)-4-chlorobenzamide can be prepared by replacing the ethanolamine in Example A2 by a molar equivalent amount of 3-hydroxypropylamine.

*Example A19*

N-(2-hydroxy-1-methylethyl)-4-chlorobenzamide can be prepared by replacing the ethanolamine in Example A2 by a molar equivalent amount of 2-hydroxy-1-methylethylamine.

*Example A20*

N-(2-hydroxypropyl)-4-chlorobenzamide can be prepared by replacing the ethanolamine in Example A2 by a molar equivalent amount of 2-hydroxypropylamine.

*Example A21*

N-(3-hydroxy-2-ethylpropyl)-4-chlorobenzamide can be prepared by replacing the ethanolamine in Example A2 by a molar equivalent amount of 3-hydroxy-2-ethylpropylamine.

*Example A22*

N-(4-hydroxybutyl)-4-chlorobenzamide can be prepared by replacing the ethanolamine in Example A2 by a molar equivalent amount of 4-hydroxybutylamine.

*Example A23*

N-(5-hydroxypentyl)-4-chlorobenzamide can be prepared by replacing the ethanolamine in Example A2 by a molar equivalent amount of 5-hydroxypentylamine.

*Example A24*

N-(2-hydroxy-1,2-dimethylethyl)-4-chlorobenzamide can be prepared by replacing the ethanolamine in Example A2 by a molar equivalent amount of 2-hydroxy-1,2-dimethylethylamine.

(B) 1,ω - DICHLORO - 1 - (MONOCARBOCYCLIC ARYL)-2-AZA-1-ALKENES, ArC(Cl)=N—Alk—Cl (IV)

*Example B1*

*1,4-dichloro-1-phenyl-2-aza-1-butene* [IV; Ar is $C_6H_5$, Alk is $CH_2CH_2$].—To a vigorously stirred solution of 33.0 g. (0.2 mole) of N-(2-hydroxyethyl)benzamide (Example A1) in 500 ml. of boiling benzene was added 83.3 g. (0.4 mole) of phosphorus pentachloride in small portions. With each addition a vigorous reaction ensued, and hydrogen chloride was evolved. As the reaction progressed, a heavy white crystalline precipitate separated, and the mixture was stirred and refluxed for three hours during which time the solid dissolved. The benzene and phosphorus oxychloride were removed by warming in vacuo, and the residual pale green oil was distilled through a 6" Vigreux column. A portion of excess phosphorus pentachloride preceded the refluxing liquid which made it necessary to disassemble the apparatus and wash out the solid which had collected on the walls of the condenser. Distillation was then continued to give 30.6 g. of 1,4-dichloro-1-phenyl-2-aza-1-butene as a colorless oil, B.P. 78–82° C. (0.1 mm.), $n_D^{25}=1.5668$.

*Analysis.*—Calcd. for $C_9H_9Cl_2N$: C, 53.49; H, 4.49; Cl, 35.09. Found: C, 53.30; H, 4.46; Cl, 35.01.

*Example B2*

1,4-dichloro-1-(4-chlorophenyl)-2-aza-1-butene [IV; Ar is $4\text{-}ClC_6H_4$, Alk is $CH_2CH_2$] was prepared from 93 g. of N-(2-hydroxyethyl)-4-chlorobenzamide (Example A2) and 196 g. of phosphorus pentachloride in 800 ml. of benzene according to the manipulative procedure described above in Example B1. There was thus obtained 95.4 g. of 1,4-dichloro-1-(4-chlorophenyl)-2-aza-1-butene, B.P. 123–133° C. (0.05–1 mm.), $n_D^{25}=1.5819$.

*Analysis.*—Calcd. for $C_9H_8Cl_3N$: C, 45.70; H, 3.41. Found: C, 45.78; H, 3.26.

*Example B3*

1,4-dichloro-1-(2-chlorophenyl)-2-aza-1-butene [IV; Ar is $2\text{-}ClC_6H_4$, Alk is $CH_2CH_2$] can be prepared by replacing the N-(2-hydroxyethyl)benzamide in Example B1 by a molar equivalent amount of N-(2-hydroxyethyl)-2-chlorobenzamide (Example A3).

*Example B4*

1,4-dichloro-1-(3-chlorophenyl)-2-aza-1-butene [IV; Ar is $3\text{-}ClC_6H_4$, Alk is $CH_2CH_2$] was prepared from 84 g. of N-(2-hydroxyethyl)-3-chlorobenzamide (Example A4) and 174.5 g. of phosphorus pentachloride in 1000 ml. of benzene according to the manipulative procedure described above in Example B1. There was thus obtained 84.5 g. of 1,4-dichloro-1-(3-chlorophenyl)-2-aza-1-butene, B.P. 109–117° C. (0.02–0.04 mm.), $n_D^{25}=1.5767\text{--}78$.

*Example B5*

1,4-dichloro-1-(4-methoxyphenyl)-2-aza-1-butene [IV; Ar is $4\text{-}CH_3OC_6H_4$, Alk is $CH_2CH_2$] was prepared from 92 g. of N-(2-hydroxyethyl)-4-methoxybenzamide (Example A5) and 196 g. of phosphorus pentachloride in 800 ml. of benzene according to the manipulative procedure described above in Example B1. There was thus obtained 1,4-dichloro-1-(4-methoxyphenyl)-2-aza-1-butene, B.P. 105–109° C. (0.3–0.5 mm.).

*Example B6*

1,4-dichloro-1-(4-nitrophenyl)-2-aza-1-butene [IV; Ar is 4-$O_2NC_6H_4$, Alk is $CH_2CH_2$] was prepared from 189 g. of N-(2-hydroxyethyl)-4-nitrobenzamide (Example A6) and 374 g. of phosphorus pentachloride in 3000 ml. of benzene according to the manipulative procedure described above in Example B1. There was thus obtained 171 g. of 1,4-dichloro-1-(4-nitrophenyl)-2-aza-1-butene which crystallized from petroleum ether (Skellysolve B) and had the M.P. 56–57° C. (uncorr.).

*Example B7*

1,4-dichloro-1-(3-methylphenyl)-2-aza-1-butene [IV; Ar is 3-$CH_3C_6H_4$, Alk is $CH_2CH_2$] can be prepared by replacing the N-(2-hydroxyethyl)benzamide in Example B1 by a molar equivalent amount of N-(2-hydroxyethyl)-3-methylbenzamide (Example A7).

*Example B8*

1,4-dichloro-1-(3-bromophenyl)-2-aza-1-butene [IV; Ar is 3-$BrC_6H_4$, Alk is $CH_2CH_2$] can be prepared by replacing the N-(2-hydroxyethyl) benzamide in Example B1 by a molar equivalent amount of N-(2-hydroxyethyl)-3-bromobenzamide (Example A8).

*Example B9*

1,4-dichloro-1-(4-methylphenyl)-2-aza-1-butene [IV; Ar is 4-$CH_3C_6H_4$, Alk is $CH_2CH_2$] can be prepared by replacing the N-(2-hydroxyethyl)benzamide in Example B1 by a molar equivalent amount of N-(2-hydroxyethyl)-4-methylbenzamide (Example A9).

*Example B10*

1,4-dichloro-1-(4-n-butoxyphenyl)-2-aza-1-butene [IV; Ar is 4-$C_4H_9OC_6H_4$, Alk is $CH_2CH_2$] can be prepared by replacing the N-(2-hydroxyethyl)benzamide in Example B1 by a molar equivalent amount of N-(2-hydroxyethyl)-H-(n-butoxy)benzamide (Example A10).

*Example B11*

1,4 - dichloro - 1 - (3,4 - dimethoxyphenyl) - 2 - aza-1-butene [IV; Ar is 3,4-$(CH_3O)_2C_6H_3$, Alk is $CH_2CH_2$] can be prepared by replacing the N-(2-hydroxyethyl)benzamide in Example B1 by a molar equivalent amount of N - (2 - hydroxyethyl) - 3,4 - dimethoxybenzamide (Example A11).

*Example B12*

1,4 - dichloro - 1 - (3,4,5 - trimethoxyphenyl) - 2-aza-1-butene [IV; Ar is 3,4,5-$(CH_3O)_3C_6H_2$, Alk is $CH_2CH_2$] can be prepared by replacing the N-(2-hydroxyethyl)benzamide in Example B1 by a molar equivalent amount of N-(2 - hydroxyethyl) - 3,4,5 - trimethoxybenzamide (Example A12).

*Example B13*

1,4 - dichloro - 1 - (3 - chloro - 4 - methoxyphenyl) - 2-aza-1-butene [IV; Ar is 3-Cl-4-$CH_3OC_6H_3$, Alk is $CH_2CH_2$]

can be prepared by replacing the N-(2-hydroxyethyl)benzamide in Example B1 by a molar equivalent amount of N - (2 - hydroxyethyl) - 3 - chloro - 4 - methoxybenzamide (Example A13).

*Example B14*

1,4 - dichloro - 1 - (4 - fluorophenyl) - 2 - aza - 1-butene [IV; Ar is 4-$FC_6H_4$, Alk is $CH_2CH_2$] can be prepared by replacing the N-(2-hydroxyethyl)benzamide in Example B1 by a molar equivalent amount of N-(2-hydroxyethyl)-4-fluorobenzamide (Example A14).

*Example B15*

1,4 - dichloro - 1 - (4 - iodophenyl) - 2 - aza - 1-butene [IV; Ar is 4-$IC_6H_4$, Alk is $CH_2CH_2$] can be prepared by replacing the N-(2-hydroxyethyl)benzamide in Example B1 by a molar equivalent amount of N-(2-hydroxyethyl)-4-iodobenzamide (Example A15).

*Example B16*

1,4 - dichloro - 1 - (4 - methylmercaptophenyl) - 2 - aza-1-butene [IV; Ar is 4-$CH_3SC_6H_4$, Alk is $CH_2CH_2$] can be prepared by replacing the N-(2-hydroxyethyl)benzamide in Example B1 by a molar equivalent amount of N - (2 - hydroxyethyl) - 4 - methylmercaptobenzamide (Example A16).

*Example B17*

1,4 - dichloro - 1 - (4 - trifluoromethylphenyl - 2 - aza-1-butene [IV; Ar is 4-$F_3CC_6H_4$, Alk is $CH_2CH_2$] can be prepared by replacing the N-(2-hydroxyethyl)benzamide in Example B1 by a molar equivalent amount of N-(2-hydroxyethyl) - 4 - trifluoromethylbenzamide (Example A17).

*Example B18*

1,5 - dichloro - 1 - (4 - chlorophenyl) - 2 - aza - 1-pentene [IV; Ar is 4-$ClC_6H_4$, Alk is $CH_2CH_2CH_2$] can be prepared by replacing the N-(2-hydroxyethyl)benzamide in Example B1 by a molar equivalent amount of N-(3-hydroxypropyl)-4-chlorobenzamide (Example A18).

*Example B19*

1,4 - dichloro - 1 - (4 - chlorophenyl) - 3 - methyl-2-aza-1-butene [IV; Ar is 4-$ClC_6H_4$, Alk is $CH(CH_3)CH_2$]

can be prepared by replacing the N-(2-hydroxyethyl)-benzamide in Example B1 by a molar equivalent amount of N - (2 - hydroxy - 1 - methylethyl) - 4 - chlorobenzamide (Example A19).

*Example B20*

1,4 - dichloro - 1 - (4 - chlorophenyl) - 2 - aza -1-pentene [IV; Ar is 4-$ClC_6H_4$, Alk is $CH_2CH(CH_3)$] can be prepared by replacing the N-(2-hydroxyethyl)-benzamide in Example B1 by a molar equivalent amount of N-(2-hydroxypropyl)-4-chlorobenzamide (Example A20).

*Example B21*

1,5 - dichloro - 1 - (4 - chlorophenyl) - 4 - ethyl - 2-aza-1-pentene [IV; Ar is 4-$ClC_6H_4$, Alk is $CH_2CH(C_2H_5)CH_2$]

can be prepared by replacing the N-(2-hydroxyethyl)-benzamide in Example B1 by a molar equivalent amount of N-(3-hydroxy-2-ethylpropyl)-4-chlorobenzamide (Example A21).

*Example B22*

1,6 - dichloro - 1 - (4 - chlorophenyl) - 2 - aza - 1-hexene [IV; Ar is 4-$ClC_6H_4$, Alk is $CH_2CH_2CH_2CH_2$] can be prepared by replacing the N-(2-hydroxyethyl)-benzamide in Example B1 by a molar equivalent amount of N-(4-hydroxybutyl)-4-chlorobenzamide (Example A22).

*Example B23*

1,7 - dichloro - 1 - (4 - chlorophenyl) - 2 - aza - 1-heptene [IV; Ar is 4-$ClC_6H_4$, Alk is $CH_2CH_2CH_2CH_2CH_2$]

can be prepared by replacing the N-(2-hydroxyethyl)-benzamide in Example B1 by a molar equivalent amount of N-(5-hydroxypentyl)-4-chlorobenzamide (Example A23).

*Example B24*

1,4 - dichloro - 1 - ( 4 - chlorophenyl) - 3 - methyl-2-aza-1-pentene [IV; Ar is 4-$ClC_6H_4$, Alk is $CH(CH_3)CH(CH_3)$]

can be prepared by replacing the N-(2-hydroxyethyl)- benzamide in Example B1 by a molar equivalent amount of N-(2-hydroxy-1,2-dimethylethyl)-4-chlorobenzamide (Example A24).

(C) 1-TERTIARY-AMINO-1-(MONOCARBOCYCLIC ARYL)-ω-CHLORO-2-AZA-1-ALKENES, ArC(N=B)=N—Alk—Cl (V)

*Example C1*

4-chloro-1-diethylamino-1-phenyl-2-aza-1-butene [V; Ar is $C_6H_5$, Alk is $CH_2CH_2$, N=B is $N(C_2H_5)_2$].—A solution of 14.6 g. (20.6 ml., 0.2 mole) of dimethylamine in 50 ml. of benzene was added to a solution of 20.2 g. (0.1 mole) of 1,4-dichloro-1-phenyl-2-aza-1-butene (Example B1) in 150 ml. of benzene. The mixture was refluxed for two hours, then cooled, and the diethylamine hydrochloride was removed by filtration. The filtrate was washed with two 300 ml. portions of water and then concentrated by warming in vacuo. The residue was distilled to give 14.6 g. of 4-chloro-1-diethylamino-1-phenyl-2-aza-1-butene, B.P. 105–110° C. (0.8 mm.), $n_D^{25}$=1.5344.

*Analysis.*—Calcd. for $C_{13}H_{19}ClN_2$: C, 65.39; H, 8.02; N, 11.74. Found: C, 65.10; H, 8.53; N, 11.83.

4-chloro-1-diethylamino-1-phenyl-2-aza-1-butene is obtained in the form of its hydrochloride, hydrofluoride, hydrobromide, hydriodide, sulfate (or bisulfate), phosphate (or acid phosphate), acetate, tartrate (or bitartrate), lactate, citrate (or acid citrate), benzenesulfonate, ethanesulfonate, methiodide, allobromide, or benzochloride salt, when contacted, respectively, with hydrochloric acid, hydrofluoric acid, hydrobromic acid, hydriodic acid, sulfuric acid, phosphoric acid, acetic acid, tartaric acid, lactic acid, citric acid, benzenesulfonic acid, ethanesulfonic acid, methyl iodide, allyl bromide, or benzyl chloride.

4-chloro-1-diethylamino-1-phenyl-2-aza-1-butene in the form of its hydrofluoride salt can be converted to the hydrochloride salt by passing an aqueous solution of the former over an ion-exchange resin saturated with chloride ion.

*Example C2*

4-chloro-1-(4-chlorophenyl)-1-diethylamino-2-aza-1-butene [V; Ar is 4-$ClC_6H_4$, Alk is $CH_2CH_2$, N=B is $N(C_2H_5)_2$] was prepared from 91.8 g. of 1,4-dichloro-1-(4-chlorophenyl)-2-aza-1-butene (Example B2) and 56.5 g. of diethylamine in 200 ml. of benzene according to the manipulative procedure described above in Example C1. The resulting product was converted to its hydrochloride salt by treating it with an excess of ethereal hydrogen chloride. The hydrochloride salt was recrystallized successively from ethanol-ether, absolute ethanol and acetone, and dried for about two days at 70–95° C. in vacuo, to give 4-chloro-1-(4-chlorophenyl)-1-diethylamino-2-aza-1-butene in the form of its hydrochloride salt, M.P. 171.6–173.2° C. (corr.).

*Analysis.*—Calcd. for $C_{13}H_{18}Cl_2N_2 \cdot HCl$: $Cl_{(labile)}$, 22.90; $Cl_{(ionic)}$, 11.45. Found: $Cl_{(labile)}$, 22.59; $Cl_{(ionic)}$, 11.42.

4-chloro-1-(4-chlorophenyl)-1-diethylamino-2-aza-1-butene was found to possess diuretic activity greater than that of theophylline when administered orally to dogs at dose levels of 3.75–15.0 mg./kg. of body weight. The oral toxicity in mice ($LD_{50}$) was 64±3.2 mg./kg.

*Example C3*

4-chloro-1-(2-chlorophenyl)-1-diethylamino-2-aza-1-butene [V; Ar is 2-$ClC_6H$, Alk is $CH_2CH_2$, N=B is $N(C_2H_5)_2$] can be prepared by replacing the 1,4-dichloro-1-phenyl-2-aza-1-butene in Example C1 by a molar equivalent amount of 1,4-dichloro-1-(2-chlorophenyl)-2-aza-1-butene (Example B3).

*Example C4*

4-chloro-1-(3-chlorophenyl)-1-diethylamino-2-aza-1-butene [V; Ar is 3-$ClC_6H_4$, Alk is $CH_2CH_2$, N=B is $N(C_2H_5)_2$] was prepared from 82.5 g. of 1,4-dichloro-1-(3-chlorophenyl)-2-aza-1-butene (Example B4) and 51.4 g. of diethylamine in 200 ml. of benzene according to the manipulative procedure described above in Example C1. There was thus obtained 31.4 g. of 4-chloro-1-(3-chlorophenyl)-1-diethylamino-2-aza-1-butene, B.P. 115–118° C. (2.5 mm.).

*Example C5*

4-chloro-1-(4-methoxyphenyl)-1-diethylamino-2-aza-1-butene [V; Ar is 4-$CH_3OC_6H_4$, Alk is $CH_2CH_2$, N=B is $N(C_2H_5)_2$] can be prepared by replacing the 1,4-dichloro-1-phenyl-2-aza-1-butene in Example C1 by a molar equivalent amount of 1,4-dichloro-1-(4-methoxyphenyl)-2-aza-1-butene (Example B5).

*Example C6*

4-chloro-1-(4-nitrophenyl)-1-diethylamino-2-aza-1-butene [V; Ar is 4-$O_2NC_6H_4$, Alk is $CH_2CH_2$, N=B is $N(C_2H_5)_2$] was prepared from 165 g. of 1,4-dichloro-1-(4-nitrophenyl)-2-aza-1-butene (Example B6) and 97.8 g. of diethylamine in 600 ml. of benzene according to the manipulative procedure described above in Example C1.

*Example C7*

4-chloro-1-(3-methylphenyl)-1-(di-n-butylamino)-2-aza-1-butene [V; Ar is 3-$CH_3C_6H_4$, Alk is $CH_2CH_2$, N=B is $N(C_4H_9)_2$] can be prepared from 1,4-dichloro-1-(3-methylphenyl)-2-aza-1-butene (Example B7) and di-n-butylamine according to the manipulative procedure described above in Example C1.

*Example C8*

4-chloro-1-(3-bromophenyl)-1-(di-n-hexylamino)-2-aza-1-butene [V; Ar is 3-$BrC_6H_4$, Alk is $CH_2CH_2$, N=B is $N(C_6H_{13})_2$] can be prepared from 1,4-dichloro-1-(3-bromophenyl)-2-aza-1-butene (Example B8) and di-n-hexylamine according to the manipulative procedure described above in Example C1.

*Example C9*

4-chloro-1-(4-methylphenyl)-1-dicyclohexylamino-2-aza-1-butene [V; Ar is 4-$CH_3C_6H_4$, Alk is $CH_2CH_2$, N=B is $N(C_6H_{11})_2$] can be prepared from 1,4-dichloro-1-(4-methylphenyl)-2-aza-1-butene (Example B9) and dicyclohexylamine according to the manipulative procedure described above in Example C1.

*Example C10*

4-chloro-1-(4-n-butoxyphenyl)-1-dicyclopentylamino-2-aza-1-butene [V; Ar is 4-$C_4H_9OC_6H_4$, Alk is $CH_2CH_2$, N=B is $N(C_5H_9)_2$] can be prepared from 1,4-dichloro-1-(4-n-butoxyphenyl)-2-aza-1-butene (Example B10) and dicyclopentylamine according to the manipulative procedure described above in Example C1.

*Example C11*

4-chloro-1-(3,4-dimethoxyphenyl)-1-bis(4-methylcyclohexyl)amino-2-aza-1-butene [V; Ar is 3,4-$(CH_3O)_2C_6H_3$ Alk is $CH_2CH_2$, N=B is $N(C_6H_{10}CH_3-4)_2$] can be prepared from 1,4-dichloro-1-(3,4-dimethoxyphenyl)-2-aza-1-butene (Example B11) and bis(4-methylcyclohexyl)amine according to the manipulative procedure described above in Example C1.

*Example C12*

4-chloro-1-(3,4,5-trimethoxyphenyl)-1-(N-methyl)cyclohexylamino-2-aza-1-butene [V; Ar is 3,4,5-$(CH_3O)_3C_6H_2$ Alk is $CH_2CH_2$, N=B is $N(C_6H_{11})(CH_3)$] can be prepared from 1,4-dichloro-1-(3,4,5-trimethoxyphenyl)-2-aza-1-butene (Example B12) and (N-methyl)cyclohexylamine according to the manipulative procedure described above in Example C1.

*Example C13*

4 - chloro - 1 - (3-chloro-4-methoxyphenyl)-1-(1-pyrrolidyl)-2-aza-1-butene [V; Ar is 3-Cl-4-CH$_3$OC$_6$H$_3$, Alk is CH$_2$CH$_2$, N=B is N(CH$_2$)$_4$] can be prepared from 1,4 - dichloro - 1-(3-chloro-4-methoxyphenyl)-2-aza-1-butene (Example B13) and pyrrolidine according to the manipulative procedure described above in Example C1.

*Example C14*

4 - chloro - 1 - (4-fluorophenyl)-1-(1-piperidyl)-2-aza-1-butene [V; Ar is 4-FC$_6$H$_4$, Alk is CH$_2$CH$_2$, N=B is N(CH$_2$)$_5$] can be prepared from 1,4-dichloro-1-(4-fluorophenyl)-2-aza-1-butene (Example B14) and piperidine according to the manipulative procedure described above in Example C1.

*Example C15*

4 - chloro - 1 - (4-iodophenyl)-1-hexamethylenimino-2-aza-1-butene [V; Ar is 4-IC$_6$H$_4$, Alk is CH$_2$CH$_2$, N=B is N(CH$_2$)$_6$] can be prepared from 1,4-dichloro-1-(4-iodophenyl)-2-aza-1-butene (Example B15) and hexamethylenimine according to the manipulative procedure described above in Example C1.

*Example C16*

4 - chloro - 1 - (4-methylmercaptophenyl)-1-(2-methyl-1-piperidyl)-2-aza-1-butene [V; Ar is 4-CH$_3$SC$_6$H$_4$, Alk is CH$_2$CH$_2$, N=B is 2-methyl-1-piperidyl] can be prepared from 1,4-dichloro-1-(4-methylmercaptophenyl)-2-aza-1-butene (Example B16) and 2-methylpiperdine according to the manipulative procedure described above in Example C1.

*Example C17*

4 - chloro - 1 - (4-trifluoromethylphenyl)-1-dibenzylamino-2-aza-1-butene [V; Ar is 4-F$_3$CC$_6$H$_4$, Alk is CH$_2$CH$_2$, N=B is N(CH$_2$C$_6$H$_5$)$_2$] can be prepared from 1,4 - dichloro-1-(4-trifluoromethylphenyl)-2-aza-1-butene (Example B17) and dibenzylamine according to the manipulative procedure described above in Example C1.

*Example C18*

5 - chloro - 1 - (4-chlorophenyl)-1-bis(2-phenylethyl)-amino-2-aza-1-pentene [V; Ar is 4-ClC$_6$H$_4$, Alk is CH$_2$CH$_2$CH$_2$, N=B is N(CH$_2$CH$_2$C$_6$H$_5$)$_2$] can be prepared from 1,5-dichloro-1-(4-chlorophenyl)-2-aza-1-pentene (Example B18) and bis(2-phenylethyl)amine according to the manipulative procedure described above in Example C1.

*Example C19*

4 - chloro - 1 - (4-chlorophenyl)-1-(N-methyl)benzylamino-3-methyl-2-aza-1-butene [V; Ar is 4-ClC$_6$H$_4$, Alk is CH(CH$_3$)CH$_2$, N=B is N(CH$_3$)(CH$_2$C$_6$H$_5$)] can be prepared from 1,4-dichloro-1-(4-chlorophenyl)-3-methyl-2-aza-1-butene (Example B19) and (N-methyl)benzylamine according to the manipulative procedure described above in Example C1.

*Example C20*

4 - chloro - 1 - (4-chlorophenyl)-1-diethylamino-2-aza-1-pentene [V; Ar is 4-ClC$_6$H$_4$, Alk is CH$_2$CH(CH$_3$), N=B is N(C$_2$H$_5$)$_2$] can be prepared from 1,4-dichloro-1-(4-chlorophenyl)-2-aza-1-pentene (Example B20) and diethylamine according to the manipulative procedure described above in Example C1.

*Example C21*

5 - chloro - 1 - (4 - chlorophenyl) - 1-diethylamino-4-ethyl-2-aza-1-pentene [V; Ar is 4ClC$_6$H$_4$, Alk is

CH$_2$CH(C$_2$H$_5$)CH$_2$

N=B is N(C$_2$H$_5$)$_2$] can be prepared from 1,5-dichloro-1 - (4 - chlorophenyl)-4-ethyl-2-aza-1-pentene (Example B21) and diethylamine according to the manipulative procedure described above in Example C1.

*Example C22*

6 - chloro - 1 - (4-chlorophenyl)-1-diethylamino-2-aza-1-hexene [V; Ar is 4-ClC$_6$H$_4$, Alk is CH$_2$CH$_2$CH$_2$CH$_2$, N=B is N(C$_2$H$_5$)$_2$] can be prepared from 1,6-dichloro-1-(4-chlorophenyl)-2-aza-1-hexene (Example B22) and diethylamine according to the manipulative procedure described above in Example C1.

*Example C23*

7 - chloro - 1 - (4-chlorophenyl)-1-diethylamino-2-aza-1-heptene [V; Ar is 4-ClC$_6$H$_4$, Alk is

CH$_2$CH$_2$CH$_2$CH$_2$CH$_2$

N=B is N(C$_2$H$_5$)$_2$] can be prepared from 1,7-dichloro-1-(4-chlorophenyl)-2-aza-1-heptene (Example B23) and diethylamine according to the manipulative procedure described above in Example C1.

*Example C24*

4 - chloro - 1 - (4-chlorophenyl) - 1 - diethylamino-3-methyl-2-aza-1-pentene [V; Ar is 4-ClC$_6$H$_4$, Alk is

CH(CH$_3$)CH(CH$_3$)

N=B is N(C$_2$H$_5$)$_2$] can be prepared from 1,4-dichloro-1-(4 - chlorophenyl) - 3-methyl - 2-aza-1-pentene (Example B24) and diethylamine according to the manipulative procedure described above in Example C1.

*Example C25*

4-chloro-1-phenyl-1-dimethylamino-2-aza-1-butene [V; Ar is C$_6$H$_5$, Alk is CH$_2$CH$_2$, N=B is N(CH$_3$)$_2$] was prepared from 20.2 g. of 1,4-dichloro-1-phenyl-2-aza-1-butene (Example B1) and 9.0 g. of dimethylamine in 100 ml. of benzene according to the manipulative procedure described above in Example C1. There was thus obtained 10.2 g. of 4-chloro-1-phenyl-1-dimethylamino-2-aza-1-butene, B.P. 91–101° C. (0.8–1.3 mm.).

*Example C26*

4 - chloro - 1-phenyl-1-(4-morpholinyl)-2-aza-1-butene [V; Ar is C$_6$H$_5$, Alk is CH$_2$CH$_2$, N=B is N(CH$_2$)$_4$O] was prepared from 20.2 g. of 1,4-dichloro-1-phenyl-2-aza-1-butene (Example B1) and 17.4 g. of morpholine in 100 ml. of benzene according to the manipulative procedure described above in Example C1. There was thus obtained 20.8 g. of 4-chloro-1-phenyl-1-(4-morpholinyl)-2-aza-1-butene as a pale yellow oil.

(D) 1-TERTIARY-AMINO-1-(MONOCARBOCYCLIC ARYL) - ω - TERTIARY - AMINO - 2 - AZA-1-ALKENES, ArC(N=B)=N—Alk—N=B' (I)

*Example D1*

*1 - diethylamino - 1 - phenyl - 4-(1-piperidyl)-2-aza-1-butene* [I; Ar is C$_6$H$_5$, Alk is CH$_2$CH$_2$, N=B is N(C$_2$H$_5$)$_2$, N=B' is N(CH$_2$)$_5$].—A mixture of 16.7 g. (0.07 mole) of 4-chloro-1-diethylamino-1-phenyl-2-aza-1-butene (Example C1), 29.9 g. (0.35 mole) of piperidine and 100 ml. of toluene was refluxed for twenty-four hours. The piperidine hydrochloride which had precipitated was removed by filtration, and the filtrate was concentrated in vacuo. The residue was distilled to give 8.7 g. of 1-diethylamino-1-phenyl-4-(1-piperidyl)-2-aza-1-butene, B.P. 116–133° C. (0.03 mm.), $n_D^{25}$=1.5291.

*Analysis.*—Calcd. for C$_{18}$H$_{29}$N$_3$: C, 75.21; H, 10.17; N, 14.62. Found: C, 75.07; H, 10.11; N, 14.63.

1 - diethylamino - 1 - phenyl-4-(1-piperidyl)-2-aza-1-butene was converted to its dihydrochloride salt by treating 6.8 g. of the free base with an excess of ethereal hydrogen chloride. The precipitated salt was separated and triturated with dry acetone and dried at 80° C. in vacuo for twenty hours. The dihydrochloride salt of 1-diethylamino - 1 - phenyl-4-(1-piperidyl)-2-aza-1-butene had the M.P. 210-221° C. (corr.) (melts on immersion at 201° C., then resolidifies).

*Analysis.*—Calcd. for $C_{13}H_{29}N_3 \cdot 2HCl$: Cl, 19.68; N, 11.66. Found: Cl, 19.45; N, 11.42.

1 - diethylamino - 1-phenyl-4-(1-piperidyl)-2-aza-1-butene dihydrochloride was found to possess diuretic activity approximately equal to that of theophylline when administered orally to dogs at dose levels of 7.5–30.0 mg./kg. of body weight.

1 - diethylamino - 1-phenyl-4-(1-piperidyl)-2-aza-1-butene is obtained in the form of its hydrofluoride, hydrobromide, hydriodide, sulfate (or bisulfate), phosphate (or acid phosphate), tartrate (or bitartrate), lactate, citrate (or acid citrate), benzenesulfonate, ethanesulfonate, methiodide, allobromide, or benzochloride salt, when contacted, respectively, with hydrofluoric acid, hydrobromic acid, hydriodic acid, sulfuric acid, phosphoric acid, acetic acid, tartaric acid, lactic acid, citric acid, benzenesulfonic acid, ethanesulfonic acid, methyl iodide, allyl bromide, or benzyl chloride.

1 - diethylamino - 1-phenyl-4-(1-piperidyl)-2-aza-1-butene in the form of its hydrofluoride salt can be converted to the hydrochloride salt by passing an aqueous solution of the former over an ion-exchange resin saturated with chloride ion.

Methyl iodide (3.0 g., 0.021 mole) was added to a solution of 3.0 g. (0.0105 mole) of 1-diethylamino-1-phenyl-4-(1-piperidyl)-2-aza-1-butene in 50 ml. of acetone. Upon cooling, the methiodide salt crystallized from solution, and it was collected and dried at 80° C. in vacuo for six hours to give 3.8 g. of 1-diethylamino-1-phenyl - 4 - (1-piperidyl)-2-aza-1-butene monomethiodide, M.P. 132.3–135.1° C. (corr.).

*Analysis.*—Calcd for $C_{19}H_{32}IN_3$: C, 53.14; H, 7.51; I, 29.56. Found: C, 53.39; H, 7.70; I, 29.65.

1 - diethylamino - 1-phenyl-4-(1-piperidyl)-2-aza-1-butene monomethiodide was found to possess diuretic activity approximately equal to that of theophylline when administered orally to dogs at dose levels of 3.75–15.0 mg./kg. of body weight. The oral toxicity in mice ($LD_{50}$) was greater than 2000 mg./kg.

Example D2

1 - diethylamino - 1-phenyl-4-(4-morpholinyl)-2-aza-1-butene [I; Ar is $C_6H_5$, Alk is $CH_2CH_2$, N=B is $N(C_2H_5)_2$, N=B' is $N(CH_2)_4O$] was prepared from 11.9 g. of 4-chloro - 1 - diethylamino-1-phenyl-2-aza-1-butene (Example C1) and 9.0 g. of morpholine in 100 ml. of toluene according to the manipulative procedure described above in Example D1. The product was distilled to give 9.6 g. of 1-diethylamino-1-phenyl-4-(4-morpholinyl)-2-aza-1-butene, B.P. 130–137° C. (0.09 mm.), $n_D$=1.5298.

*Analysis.*—Calcd. for $C_{17}H_{27}N_3O$: C, 70.55; H, 9.41; N, 14.52. Found: C, 70.92; H, 9.38; N, 14.31.

A sample of the free base was treated with an excess of ethereal hydrogen chloride to give 1-diethylamino-1-phenyl-4-(4-morpholinyl)-2-aza-1-butene in the form of its dihydrochloride salt, M.P. 196.7–198.4° C. (corr.) when recrystallized from an ethanol-ether mixture.

*Analysis.*—Calcd. for $C_{17}H_{27}N_3O \cdot 2HCl$: C, 56.35; H, 8.07. Found: C, 56.45; H, 7.43.

1 - diethylamino - 1-phenyl-4-(4-morpholinyl)-2-aza-1-butene dihydrochloride was found to possess diuretic activity approximately equal to that of theophylline when administered orally to dogs at dose levels of 7.5–30.0 mg./kg. of body weight. The oral toxicity in mice ($ALD_{50}$) was 875 mg./kg.

Example D3

*1 - diethylamino - 1-phenyl-4-dimethylamino-2-aza-1-butene* [I; Ar is $C_6H_5$, Alk is $CH_2CH_2$, N=B is $N(C_2H_5)_2$, N=B' is $N(CH_3)_2$].—A mixture of 24 g. of 4-chloro-1-diethylamino-1-phenyl-2-aza-1-butene (Example C1) and 9 g. of dimethylamine in 100 ml. of benzene was heated for eight hours in an autoclave at 98–101° C. and 50 lbs. per sq. inch. The precipitated dimethylamine hydrochloride was removed by filtration, and the filtrate was washed with water and sodium chloride solution and concentrated in vacuo. The residue was distilled to give 11.9 g. of 1 - diethylamino-1-phenyl-4-dimethylamino-2-aza-1-butene, B.P. 91–94.5° C. (0.03 mm.), $n_D$=1.5180.

*Analysis.*—Calcd. for $C_{15}H_{25}N_3$: C, 72.82; H, 10.19; N, 16.99. Found: C, 72.80; H, 10.05; N, 16.84.

A portion of the free base was treated with an excess of ethereal hydrogen chloride to give 1-diethylamino-1-phenyl-4-dimethylamino-2-aza-1-butene in the form of its dihydrochloride salt, M.P. 185.0–187.5° C. (corr.) when recrystallized from an acetone-methanol mixture and dried for fifteen hours in a vacuum oven at 85–89° C.

*Analysis.*—Calcd. for $C_{15}H_{25}N_3 \cdot HCl$: Cl, 22.14; N, 13.12. Found: Cl, 21.67; N, 13.05.

A portion of the free base was treated with an excess of methyl iodide in petroleum ether (Skellysolve A) solution to give 1-diethylamino-1-phenyl-4-dimethylamino-2-aza-1-butene in the form of its monomethiodide salt, M.P. 149.9–151.0° C. (corr.) when recrystallized from an acetone-ether mixture.

*Analysis.*—Calcd. for $C_{16}H_{28}IN_3$: C, 49.36; H, 7.25; I, 32.6. Found: C, 49.42; H, 7.28; I, 32.0.

1-diethylamino-1-phenyl-4 - dimethylamino-2-aza-1-butene monomethiodide was found to possess diuretic activity approximately equal to that of theophylline when administered orally to dogs at dose levels of 7.5–30 mg./kg. of body weight.

Example D4

1,4-bis(diethylamino)-1-phenyl-2-aza-1-butene [I; Ar is $C_6H_5$, Alk is $CH_2CH_2$, N=B and N=B' are $N(C_2H_5)_2$] was prepared from 24 g. of 4-chloro-1-diethylamino-1-phenyl-2-aza-1-butene (Example C1) and 73.1 g. of diethylamine in 10 ml. of benzene according to the manipulative procedure described above in Example D3. There was thus obtained 10.4 g. of 1,4-bis(diethylamino)-1-phenyl-2-aza-1-butene, B.P. 108–114° C. (0.04 mm.), $n_D^{25}$=1.5114.

*Analysis.*—Calcd. for $C_{17}H_{29}N_3$: C, 74.13; H, 10.61; N, 15.26. Found: C, 74.49; H, 10.39; N, 15.23.

A portion of the free base was treated with an excess of methyl iodide in acetone solution to give 1,4-bis(diethylamino)-1-phenyl-2-aza-1-butene in the form of its monomethiodide salt, M.P. 113.7–115.3° C. (corr.) when recrystallized from an acetone-ether mixture.

*Analysis.*—Calcd. for $C_{18}H_{32}IN_3$: C, 51.79; H, 7.73; I, 30.4. Found: C, 51.83; H, 7.46; I, 30.4.

Example D5

*1-phenyl-1,4-bis(1-piperidyl)-2-aza-1-butene* [I; Ar is $C_6H_5$, Alk is $CH_2CH_2$, N=B and N=B' are $N(CH_2)_5$].—1,4 - dichloro - 1-phenyl-2-aza-1-butene Example B1) (32.4 g., 0.16 moles) was dissolved in 500 ml. of toluene and mixed with 68.1 g. (0.8 mole) of piperidine. The solution became warm and piperidine hydrochloride separated, and the mixture was then heated at reflux for sixteen hours. The piperidine hydrochloride was removed by filtration, and the filtrate was extracted with two 300 ml. portions of water and concentrated in vacuo. The residue was distilled to give 32 g. of 1-phenyl-1,4-bis(1-piperidyl)-2-aza-1-butene, B.P. 136–138° C. (0.05 mm.), $n_D^{25}$=1.5493.

*Analysis.*—Calcd. for $C_{19}H_{29}N_3$: C, 76.2; H, 9.8; N, 14.0. Found: C, 76.0; H, 9.7; N, 14.1.

A portion of the free base was treated with an excess of ethereal hydrogen chloride to give 1-phenyl-1,4-bis(1-piperidyl)-2-aza-1-butene in the form of its dihydrochloride salt, M.P. 177.9–180.2° C. (corr.) when recrystallized from acetone and dried at 80° C. in vacuo for twenty-four hours.

*Analysis.*—Calcd. for $C_{19}H_{29}N_3 \cdot 2HCl$: Cl, 19.05; N, 11.28. Found: Cl, 18.80; N, 11.04.

1-phenyl-1,4-bis(1-piperidyl)-2-aza-1-butene dihydrochloride was found to possess diuretic activity approximately equal to that of theophylline when administered orally to dogs at dose levels of 7.5–30.0 mg./kg.

Example D6

1-diethylamino-1-(4-chlorophenyl)-4-(1 - piperidyl)-2-aza-1-butene [I; Ar is 4-ClC$_6$H$_4$, Alk is CH$_2$CH$_2$, N=B is N(C$_2$H$_5$)$_2$, N=B' is N(CH$_2$)$_5$] was prepared from 25 g. of 4-chloro-1-(4 - chlorophenyl)-1-diethylamino-2-aza-1-butene (Example C2) and 17.0 g. of piperidine in 150 ml. of toluene according to the manipulative procedure described above in Example D1. There was thus obtained 19.9 g. of 1-diethylamino-1-(4-chlorophenyl)-4-(1-piperidyl)-2-aza-1-butene, B.P. 141–148° C. (0.1–0.2 mm.), $n_D^{25}$=1.5392.

Analysis.—Calcd. for C$_{18}$H$_{28}$ClN$_3$: C, 67.16; H, 8.77; N, 13.05. Found: C, 67.43; H, 8.97; N, 13.00.

A portion of the free base was treated with an excess of ethereal hydrogen chloride to give 1-diethylamino-1-(4-chlorophenyl)-4-(1-piperidyl)-2-aza-1-butene in the form of its dihydrochloride salt, M.P. 195.4–197.8° C. (corr.) when recrystallized from an acetone-methanol mixture and dried in a vacuum desiccator.

Analysis.—Calcd. for C$_{18}$H$_{28}$ClN$_3$·2HCl: N, 10.64; Cl$_{ionic}$, 17.96. Found: N, 10.64; Cl$_{ionic}$, 17.88.

A portion of 1-diethylamino-1-(4-chlorophenyl)-4-(1-piperidyl)-2-aza-1-butene in the free base form was treated with an excess of methyl iodide in acetone solution to give 1-diethylamino-1-(4-chlorophenyl)-4-(1-piperidyl)-2-aza-1-butene in the form of its dimethiodide salt, M.P. 170.2–177.5° C. (corr.) when recrystallized from isopropyl alcohol.

Analysis.—Calcd. for C$_{20}$H$_{34}$ClI$_2$N$_3$: I, 41.9; N, 6.92. Found: I, 41.8; N, 6.85.

Example D7

1-diethylamino-1-(4-chlorophenyl)-4-(4-morpholinyl)-2-aza-1-butene [I; Ar is 4–ClC$_6$H$_4$, Alk is CH$_2$CH$_2$, N=B is N(C$_2$H$_5$)$_2$, N=B' is N(CH$_2$)$_4$O] was prepared from 25 g. of 4-chloro-1-(4-chlorophenyl)-1-diethylamino-2-aza-1-butene (Example C2) and 17.4 g. of morpholine in 150 ml. of toluene according to the manipulative procedure described above in Example D1. There was thus obtained 16.1 g. of 1-diethylamino-1-(4-chlorophenyl)-4-(4 - morpholinyl)-2-aza-1-butene, B.P. 163–166° C. (0.08–0.1 mm.), $n_D^{25}$=1.5407. The free base was converted to its dihydrochloride salt by treating it with an excess of ethereal hydrogen chloride, said salt having the M.P. 165.9–169.3° C. (corr.) when recrystallized from an acetone-methanol mixture and dried at 65–70° C. in vacuo for eighteen hours.

Analysis.—Calcd. for C$_{17}$H$_{26}$ClN$_3$O·2HCl: N, 10.59; Cl$_{ionic}$, 17.87. Found: N, 10.47; Cl$_{ionic}$ 17.52.

1-diethylamino-1-(4-chlorophenyl)-4-(4-morpholinyl)-2-aza-1-butene dihydrochloride was found to possess diuretic activity approximately equal to that of theophylline when administered orally to dogs at dose levels of 7.5–30.0 mg./kg. of body weight.

A sample of the free base was treated with an excess of methyl iodide in petroleum ether (Skellysolve A) solution to give 1-diethylamino-1-(4-chlorophenyl)-4-(4-morpholinyl)-2-aza-1-butene in the form of its monomethiodide salt, M.P. 149.3–151.3° C. (corr.) when recrystallized from acetone and dried at 80° C. in vacuo for three hours.

Analysis.—Calcd. for C$_{18}$H$_{29}$ClIN$_3$O: C, 46.41; H, 6.28; I, 27.3. Found: C, 46.69; H, 5.85; I, 27.1.

Example D8

1-diethylamino-1-(2 - chlorophenyl) - 4 - (di - n - butylamino)-2-aza-1-butene [I; Ar is 2–ClC$_6$H$_4$, Alk is Ch$_2$CH$_2$, N=B is N(C$_2$H$_5$), N=B' is N(C$_4$H$_9$)$_2$] can be prepared from 4-chloro-1-(2-chlorophenyl)-1-diethylamino-2-aza-1-butene (Example C3) and di-n-butylamine according to the manipulative procedure described above in Example D1.

Example D9

1-diethylamino-1-(3-chlorophenyl) - 4 - (di - n - hexylamino)-2-aza-1-butene [I; Ar is 3-ClC$_6$H$_4$, Alk is CH$_2$CH$_2$, N=B is N(C$_2$H$_5$)$_2$, N=B' is N(C$_6$H$_{13}$)$_2$] can be prepared from 4-chloro-1-(3-chlorophenyl)-1-diethylamino-2-aza-1-butene (Example C4) and di-n-hexylamine according to the manipulative procedure described above in Example D1.

Example D10

1-diethylamino - 1 - (4-methoxyphenyl) - 4 - dimethylamino-2-aza-1-butene [I; Ar is 4-CH$_3$OC$_6$H$_4$, Alk is CH$_2$CH$_2$, N=B is N(C$_2$H$_5$)$_2$, N=B' is N(CH$_3$)$_2$] can be prepared from 4-chloro-1-(4-methoxyphenyl)-1-diethylamino-2-aza-1-butene (Example C5) and dimethylamine according to the manipulative procedure described above in Example D1.

Example D11

1-diethylamino-1-(4-nitrophenyl) - 4 - dicyclohexylamino-2-aza-1-butene [I; Ar is 4-O$_2$NC$_6$H$_4$, Alk is CH$_2$CH$_2$, N=B is N(C$_2$H$_5$)$_2$, N=B' is N(C$_6$H$_{11}$)$_2$] can be prepared from 4-chloro - 1 - (4-nitrophenyl) - 1 - diethylamino-2-aza-1-butene (Example C6) and dicyclohexylamine according to the manipulative procedure described above in Example D1.

Example D12

1-(di-n-butylamino) - 1 - (3-methylphenyl)-4-dicyclopentylamino - 2 - aza-1-butene [I; Ar is 3-CH$_3$C$_6$H$_4$, Alk is CH$_2$CH$_2$, N=B is N(C$_4$H$_9$)$_2$, N=B' is N(C$_5$H$_9$)$_2$] can be prepared from 4-chloro - 1 - (3-methylphenyl)-1-(di-n-butylamino)-2-aza-1-butene (Example C7) and dicyclopentylamine according to the manipulative procedure described above in Example D1.

Example D13

1-(di-n-hexylamino) - 1 - (3-bromophenyl)-4-bis(4-methylcyclohexyl)amino - 2 - aza-1-butene [I; Ar is 3-BrC$_6$H$_4$, Alk is CH$_2$CH$_2$, N=B is N(C$_6$H$_{13}$)$_2$, N=B' is N(C$_6$H$_{10}$CH$_3$-4)$_2$] can be prepared from 4-chloro-1-(3-bromophenyl) - 1 - (di-n-hexylamino) - 2 - aza-1-butene (Example C8) and bis(4-methylcyclohexyl)amine according to the manipulative procedure described above in Example D1.

Example D14

1-Dicyclohexylamino - 1 - (4-methylphenyl) - 4 - (N-methyl)cyclohexylamino - 2 - aza-1-butene [I; Ar is 4-CH$_3$C$_6$H$_4$, Alk is CH$_2$CH$_2$, N=B is N(C$_6$H$_{11}$)$_2$, N=B' is N(C$_6$H$_{11}$)(CH$_3$)] can be prepared from 4-chloro-1-(4-methylphenyl) - 1 - dicyclohexylamino-2-aza-1-butene (Example C9) and N-methylcyclohexylamine according to the manipulative procedure described above in Example D1.

Example D15

1-dicyclopentylamino - 1 - (4-n-butoxyphenyl) - 4 - (1-pyrrolidyl)-2-aza-1-butene [I; Ar is 4-C$_4$H$_9$OC$_6$H$_4$, Alk is CH$_2$CH$_2$, N=B is N(C$_5$H$_9$)$_2$, N=B' is N(CH$_2$)$_4$] can be prepared from 4-chloro - 1 - (4-n-butoxyphenyl)-1-dicyclopentylamino - 2 - aza-1-butene (Example C10) and pyrrolidine according to the manipulative procedure described above in Example D1.

Example D16

1-bis(4-methylcyclohexyl)amino - 1 - (3,4-dimethoxyphenyl) - 4 - (1-piperidyl) - 2 - aza-1-butene [I; Ar is 3,4-(CH$_3$O)$_2$C$_6$H$_3$, Alk is CH$_2$CH$_2$, N=B is $$N(C_6H_{10}CH_3-4)_2$$

N=B' is N(CH$_2$)$_5$] can be prepared from 4-chloro-1-(3,4-dimethoxyphenyl) - 1 - bis(4-methylcyclohexyl)amino-2-aza-1-butene (Example C11) and piperidine according to the manipulative procedure described above in Example D1.

Example D17

1-(N-methyl)cyclohexylamino - 1 - (3,4,5-trimethoxyphenyl) - 4 - hexamethylenimino - 2 - aza-1-butene [I; Ar is 3,4,5-$(CH_3O)_3C_6H_2$, Alk is $CH_2CH_2$, N=B is $$N(C_6H_{11})(CH_3)$$

N=B' is $N(CH_2)_6$] can be prepared from 4-chloro-1-(3-4,5-trimethoxyphenyl) - 1 - (N-methyl)cyclohexylamino-2-aza-1-butene (Example C12) and hexamethylenimine according to the manipulative procedure described above in Example D1.

Example D18

1-(1-pyrrolidyl) - 1 - (3-chloro - 4 - methoxyphenyl)-4-(2-methyl-1-piperidyl)-2-aza-1-butene [I; Ar is $$3\text{-Cl-}4\text{-}CH_3OC_6H_3$$

Alk is $CH_2CH_2$, N=B is $N(CH_2)_4$, N=B' is 2-methyl-1-piperidyl] can be prepared from 4-chloro-1-(3-chloro-4-methoxyphenyl) - 1 - (1-pyrrolidyl) - 2 - aza-1-butene (Example C13) and 2-methylpiperidine according to the manipulative procedure described above in Example D1.

Example D19

1-(1-piperidyl) 1 - (4-fluorophenyl)-4-(4-morpholinyl)-2-aza - 1 - butene [I; Ar is 4-$FC_6H_4$, Alk is $CH_2CH_2$, N=B is $N(CH_2)_5$, N=B' is $N(CH_2)_4O$] can be prepared from 4-chloro - 1 - (4-fluorophenyl)-1-(1-piperidyl)-2-aza-1-butene (Example C14) and morpholine according to the manipulative procedure described above in Example D1.

Example D20

1-hexamethylenimino - 1 - (4-iodophenyl) - 4 - dibenzylamino-2-aza-1-butene [I; Ar is 4-$IC_6H_4$, Alk is $CH_2CH_2$, N=B is $N(CH_2)_6$, N=B' is $N(CH_2C_6H_5)_2$] can be prepared from 4-chloro - 1 - (4-iodophenyl) - 1 - hexamethylenimino-2-aza-1-butene (Example C15) and dibenzylamine according to the manipulative procedure described above in Example D1.

Example D21

1-(2-methyl - 1 - piperidyl) - 1 - (4-methylmercaptophenyl) - 4 - (N-methyl)benzylamino-2-aza-1-butene [I; Ar is 4-$CH_3SC_6H_4$, Alk is $CH_2CH_2$, N=B is 2-methyl-1-piperidyl, N=B' is $N(CH_3)(CH_2C_6H_5)$] can be prepared from 4-chloro-1-(4-methylmercaptophenyl) - 1 - (2-methyl-1-piperidyl) - 2 - aza-1-butene (Example C16) and N-methylbenzylamine according to the manipulative procedure described above in Example D1.

Example D22

1-dibenzylamino - 1 - (4-trifluoromethylphenyl)-4-(1-piperidyl) - 2 - aza-1-butene [I; Ar is 4-$F_3CC_6H_4$, Alk is $CH_2CH_2$, N=B is $N(CH_2C_6H_5)_2$, N=B' is $N(CH_2)_5$] can be prepared from 4-chloro - 1 - (4-trifluoromethylphenyl) - 1 - dibenzylamino - 2- aza - 1-butene (Example C17) and piperidine according to the manipulative procedure described above in Example D1.

Example D23

1-bis(2-phenylethyl)amino - 1 - (4-chlorophenyl)-5-(1-piperidyl) - 2 - aza-1-pentene [I; Ar is 4-$ClC_6H_4$, Alk is $CH_2CH_2CH_2$, N=B is $N(CH_2CH_2C_6H_5)_2$, N=B' is $N(CH_2)_5$] can be prepared from 5-chloro-1-(4-chlorophenyl) - 1 - bis(2-phenylethyl)amino-2-aza-1-pentene (Example C18) and piperidine according to the manipulative procedure described above in Example D1.

Example D24

1-(N-methyl)benzylamino - 1 - (4-chlorophenyl)-3-methyl - 4 - (1-piperidyl) - 2 - aza-1-butene [I; Ar is 4-$ClC_6H_4$, Alk is $CH(CH_3)CH_2$, N=B is $$N(CH_3)(CH_2C_6H_5)$$

N=B' is $N(CH_2)_5$] can be prepared from 4-chloro-1-(4-chlorophenyl) - 1 - (N-methyl)benzylamino-3-methyl-2-aza-1-butene (Example C19) and piperidine according to the manipulative procedure described above in Example D1.

Example D25

1-diethylamino - 1 - (4-chlorophenyl)-4-(1-piperidyl)-2-aza-1-pentene [I; Ar is 4-$ClC_6H_4$, Alk is $CH_2CH(CH_3)$, N=B is $N(C_2H_5)_2$, N=B' is $N(CH_2)_5$] can be prepared from 4-chloro-1-(4-chlorophenyl)-1-diethylamino-2-aza-1-pentene (Example C20) and piperidine according to the manipulative procedure described above in Example D1.

Example D26

1 - diethylamino - 1 - (4-chlorophenyl) - 4 - ethyl-5-(1-piperidyl) - 2 - aza-1-pentene [I; Ar is 4-$ClC_6H_4$, Alk is $CH_2CH(C_2H_5)CH_2$, N=B is $N(C_2H_5)_2$, N=B' is $N(CH_2)_5$] can be prepared from 5-chloro-1-(4-chlorophenyl)-1-diethylamino - 4 - ethyl-2-aza-1-pentene (Example C21) and piperidine according to the manipulative procedure described above in Example D1.

Example D27

1 - diethylamino-1-(4-chlorophenyl)-6-(1-piperidyl)-2-aza-1-hexene [I; Ar is 4-$ClC_6H_4$, Alk is $CH_2CH_2CH_2CH_2$, N=B is $N(C_2H_5)_2$, N=B' is $N(CH_2)_5$] can be prepared from 6-chloro-1-(4-chlorophenyl)-1-diethylamino-2-aza-1-hexene (Example C22) and piperidine according to the manipulative procedure described above in Example D1.

Example D28

1-diethylamino-1-(4-chlorophenyl)-7-(1 - piperidyl - 2-aza-1-heptene [I; Ar is 4-$ClC_6H_4$, Alk is $$CH_2CH_2CH_2CH_2CH_2$$

N=B is $N(C_2H_5)_2$, N=B' is $N(CH_2)_5$] can be prepared from 7-chloro-1-(4-chlorophenyl)-1-diethylamino-2-aza-1-heptene (Example C23) and piperidine according to the manipulative procedure described above in Example D1.

Example D29

1 - diethylamino - 1 - (4-chlorophenyl)-3-methyl-4-(1-piperidyl)-2-aza-1-pentene [I; Ar is 4-$ClC_6H_4$, Alk is $CH(CH_3)CH(CH_3)$, N=B is $N(C_2H_5)_2$, N=B' is $N(CH_2)_5$] can be prepared from 4-chloro-1-(4-chlorophenyl)-1-diethylamino-3-methyl-2 - aza-1 - pentene (Example C24) and piperidine according to the manipulative procedure described above in Example D1.

Example D30

1 - dimethylamino - 1 - phenyl-4-(1-piperidyl)-2-aza-1-butene [I; Ar is $C_6H_5$, Alk is $CH_2CH_2$, N=B is $N(CH_3)_2$, N=B' is $N(CH_2)_5$] was prepared from 10.5 g. of 4-chloro-1-phenyl-1-dimethylamino-2-aza - 1 - butene (Example C25) and 8.5 g. of piperidine in 100 ml. of toluene according to the manipulative procedure described above in Example D1.

Example D31

1 - (4 - morpholinyl)-1-phenyl-4-(1-piperidyl)-2-aza-1-butene [I; Ar is $C_6H_5$, Alk is $CH_2CH_2$, N=B is $N(CH_2)_4O$, N=B' is $N(CH_2)_5$] was prepared from 20.8 g. of 4-chloro-1-phenyl-1-(4-morpholinyl)-2-aza-1-butene (Example C26) and 9.1 g. of piperidine in 125 ml. of toluene according to the manipulative procedure described above in Example D1.

I claim:

1. A member of the group consisting of (A) a compound having the formula $$\begin{array}{c} \text{N}=\text{B} \\ | \\ \text{Ar}-\text{C}=\text{N}-\text{Alk}-\text{N}=\text{B}' \end{array}$$

wherein Ar represents monocarbocyclic aryl, Alk represents lower-alkylene, and N=B and N=B' represent members of the group consisting of di-lower-alkylamino, dicycloalkylamino in which cycloalkyl has from 5 to 6 ring members, (lower-alkyl)-(cycloalkyl)amino in which cycloalkyl has from 5 to 6 ring members, polymethylenimino having from 5 to 7 ring members, 4-morpholinyl, di-(phenyl-lower-alkyl)amino, and lower-alkyl-(phenyl-lower-alkyl)amino; (B) acid-addition salts thereof; and (C) lower-alkyl, lower-alkenyl and monocarbocyclic aryl-lower-alkyl quaternary ammonium salts thereof; monocarbocyclic aryl in each intsance being selected from the group consisting of plenyl and phenyl substituted by from one to three substituents selected from lower-alkyl, lower-alkoxy, halogen, lower-alkylmercapto, trifluoromethyl and nitro.

2. A compound according to claim 1 wherein Alk represents ethylene.

3. A compound having the formula

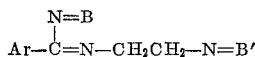

wherein Ar represents phenyl, and N=B and N=B' represent polymethylenimino having from 5 to 7 ring members.

4. A compound having the formula

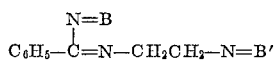

wherein N=B and N=B' represent di-lower-alkylamino.

5. A compound having the formula

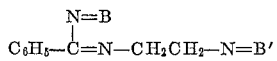

wherein N=B represents di-lower-alkylamino, and N=B' represents polymethylenimino having from 5 to 7 ring members.

6. A compound having the formula

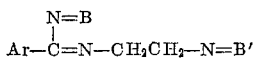

wherein Ar represents 4-chlorophenyl, N=B represents di-lower-alkylamino, and N=B' represents polymethylenimino having from 5 to 7 ring members.

7. A compound having the formula

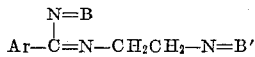

wherein Ar represents 4-chlorophenyl, N=B represents di-lower-alkylamino, and N=B' represents 4-morpholinyl.

8. 1-diethylamino-1-phenyl-4-(1-piperidyl)-2-aza-1-butene.

9. 1 - diethylamino-1-phenyl-4-(4-morpholinyl)-2-aza-1-butene.

10. 1-diethylamino-1-phenyl-4-dimethylamino-2-aza-1-butene.

11. 1,4-bis(diethylamino)-1-phenyl-2-aza-1-butene 12. 1-phenyl-1,4-bis(1-piperidyl)-2-aza-1-butene.

13. 1-diethylamino-1-(4-chlorophenyl)-4-(1-piperidyl)-2-aza-1-butene.

14. 1 - diethylamino - 1 - (4 - chlorophenyl)-4-(4-morpholinyl)-2-aza-1-butene.

15. The process for preparing a compound having the formula

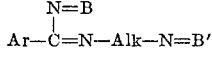

wherein Ar represents a member of the group consisting of phenyl and phenyl substituted by from one to three substituents selected from lower-alkyl, lower-alkoxy, halogen, lower-alkylmercapto, trifluoromethyl and nitro, Alk represents lower-alkylene, and N=B and N=B' represent members of the group consisting of di-lower-alkylamino, dicycloalkylamino in which cycloalkyl has from 5 to 6 ring members, (lower-alkyl)-(cycloalkyl)amino in which cycloalkyl has from 5 to 6 ring members, polymethylenimino having from 5 to 7 ring members, 4-morpholinyl, di-(phenyl-lower-alkyl)amino, and lower-alkyl-(phenyl-lower-alkyl)amino, which comprises reacting a compound having the formula

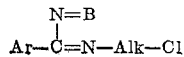

with at least two molar equivalents of a secondary amine of the formula HN=B'.

16. The process for preparing a compound having the formula

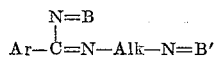

wherein Ar represents a member of the group consisting of phenyl and phenyl substituted by from one to three substituents selected from lower-alkyl, lower-alkoxy, halogen, lower-alkylmercapto, trifluoromethyl and nitro, Alk represents lower-alkylene, and N=B and N=B' represent members of the group consisting of di-lower-alkylamino, dicycloalkylamino in which cycloalkyl has from 5 to 6 ring members, (lower-alkyl)-(cycloalkyl)amino in which cycloalkyl has from 5 to 6 ring members, polymethylenimino having from 5 to 7 ring members, 4-morpholinyl, di-(phenyl-lower-alkyl)amino, and lower-alkyl-(phenyl-lower-alkyl)amino which are identical, which comprises reacting a compound having the formula

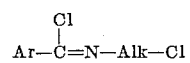

with at least four molar equivalents of a secondary amine of the formula HN=B.

17. A member of the group consisting of (A) a compound having the formula

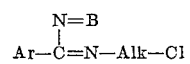

wherein Ar represents monocarbocyclic aryl, Alk represents lower-alkylene, and N=B represents a member of the group consisting of di-lower-alkylamino, dicycloalkylamino in which cycloalkyl has from 5 to 6 ring members, (lower-alkyl)-(cycloalkyl)amino in which cycloalkyl has from 5 to 6 ring members, polymethylenimino having from 5 to 7 ring members, 4-morpholinyl, di-(phenyl-lower-alkyl)amino, and lower-alkyl-(phenyl-lower-alkyl)amino; (B) acid-addition salts thereof; and (C) lower-alkyl, lower alkenyl and monocarbocyclic aryl-lower-alkyl quaternary ammonium salts thereof; monocarbocyclic aryl in each instance being selected from the group consisting of phenyl and phenyl substituted by from one to three substituents selected from lower-alkyl, lower-alkoxy, halogen, lower-alkylmercapto, trifluoromethyl and nitro.

18. A compound according to claim 17 wherein Alk represents ethylene.

19. A compound having the formula

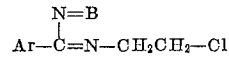

wherein Ar represents phenyl, and N=B represents di-lower-alkylamino.

20. 4-chloro-1-diethylamino-1-phenyl-2-aza-1-butene.

21. 4 - chloro - 1-(4-chlorophenyl) - 1-diethylamino-2-aza-1-butene.

22. The process for preparing a compound having the formula

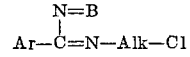

wherein Ar represents a member of the group consisting of phenyl and phenyl substituted by from one to three substituents selected from lower-alkyl, lower-alkoxy, halogen, lower-alkylmercapto, trifluoromethyl and nitro, Alk represents lower-alkylene, and N=B represents a member of the group consisting of di-lower-alkylamino, dicycloalkylamino in which cycloalkyl has from 5 to 6 ring members, (lower-alkyl)-(cycloalkyl)amino in which cycloalkyl has from 5 to 6 ring members, polymethylenimino having from 5 to 7 ring members, 4-morpholinyl, di-(phenyl-lower-alkyl)amino, and lower-alkyl-(phenyl-lower-alkyl)amino, which comprises reacting a compound having the formula $$Ar-\underset{\underset{Cl}{|}}{C}=N-Alk-Cl$$

with about two molar equivalents of a secondary amine of the formula HN=B.

References Cited in the file of this patent

UNITED STATES PATENTS

| | | |
|---|---|---|
| 2,575,991 | Baltzly et al. | Nov. 20, 1951 |
| 2,762,812 | Archer et al. | Sept. 11, 1956 |
| 2,765,340 | Haury | Oct. 2, 1956 |
| 2,945,032 | Marxer | July 12, 1960 |
| 2,914,560 | Robertson | Nov. 24, 1959 |

UNITED STATES PATENT OFFICE
CERTIFICATE OF CORRECTION

Patent No. 3,125,573                          March 17, 1964

Bill Elpern

It is hereby certified that error appears in the above numbered patent requiring correction and that the said Letters Patent should read as corrected below.

In the heading to the printed specification, line 2, for "-(MONOCARBOXYLIC" read -- -(MONOCARBOCYCLIC --; column 7, line 41, for "-H-" read -- -4- --; column 9, line 12, for "dimethylamine" read -- diethylamine --; line 68, for "2-ClC$_6$H." read -- 2-ClC$_6$H$_4$, --; column 15, line 71, for "N(C$_2$H$_5$)," read -- N(C$_2$H$_5$)$_2$, --; column 19, line 7, for "plenyl" read -- phenyl --.

Signed and sealed this 4th day of August 1964.

(SEAL)
Attest:

ERNEST W. SWIDER                            EDWARD J. BRENNER
Attesting Officer                              Commissioner of Patents